June 21, 1949.  R. S. DEWEY  2,473,513
SEALING AND POSITIONING MEANS FOR
GRINDER MECHANISMS OR THE LIKE
Filed April 17, 1946
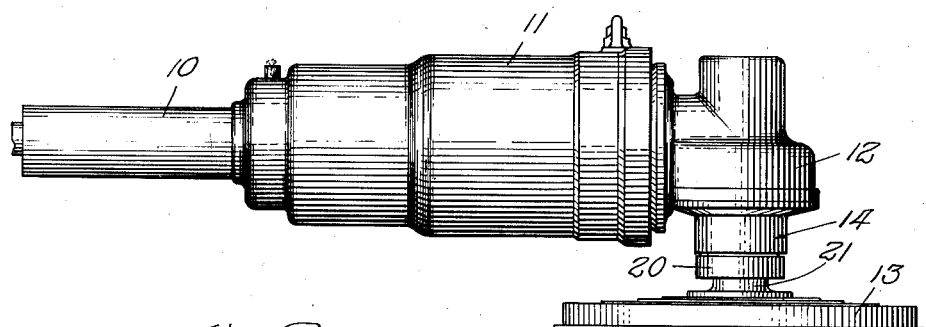
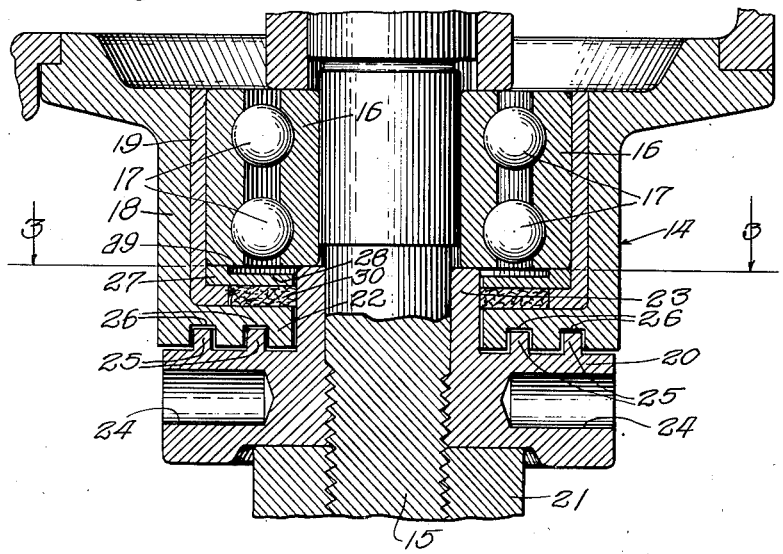
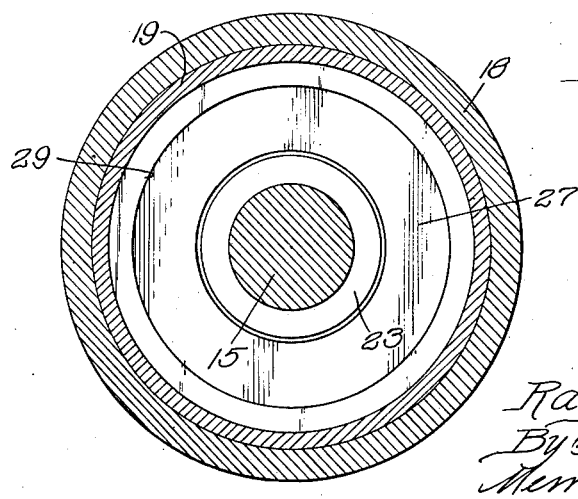
Inventor
Raymond S. Dewey,
By Hinton, Schroeder,
Merriam & Koppen, Attys.

Patented June 21, 1949

2,473,513

UNITED STATES PATENT OFFICE 2,473,513

SEALING AND POSITIONING MEANS FOR GRINDER MECHANISMS OR THE LIKE

Raymond S. Dewey, Chicago, Ill., assignor to Chicago Bridge & Iron Company, a corporation of Illinois Application April 17, 1946, Serial No. 662,880

6 Claims. (Cl. 308—187.1)

This invention relates to a sealing and positioning means for the bearings of a mechanism that is to be used in an atmosphere of dust, and relates particularly to such a sealing and positioning means for a grinder or the like.

Grinders, polishers, and other machines are customarily used in an atmosphere where fine particles of dust are present. It is necessary in these machines that the bearings be sealed so that no dust can get into the bearings, and so that lubricating oil may be retained in the bearings. Various means have been proposed for accomplishing this, but most of them have been unsatisfactory, for various reasons.

The present invention is useful in those machines having a driving spindle and a bearing race for bearings around the spindle. The invention comprises an annular metal washer in contact with the lower end of a bearing race and an annular sealing washer of a compressible material in contact with the metal washer and extending from an annular cover for the bearing race to the driven portion of the machine. This sealing washer is preferably made of felt and forms a tight seal to prevent lubricating oil from escaping, and also to prevent dust and other particles from being drawn into the bearings.

The invention will be described as related to the portable electric grinder shown in the accompanying drawings. Of the drawings Fig. 1 is an elevation of a portable grinder embodying the invention; Fig. 2 is a longitudinal section through the lower portion of the grinder head, and Fig. 3 is a transverse section taken along line 3—3 of Fig. 2.

The grinder shown in the accompanying drawings comprises a handle 10, a motor-containing body portion 11, a grinder head 12 and a circular grinder body 13 substantially at right angles to the head 12.

The lower portion 14 of the grinder head comprises a spindle 15 that is driven by the motor and has attached to its lower surface the grinder body 13, a bearing race 16, bearings 17 therein, a gear case cover 18 around the bearing race, a bushing 19 between the cover 18 and the outer portion of the bearing race 16, a driving collar 20 surrounding the outer end of the spindle, and a sander disk hub 21 on the lower end of the spindle 15. The gear case cover 18 has an annular portion 22 below and spaced from the bearing race 16 and extending toward the spindle 15. The driving collar 20 has an annular portion 23 around the spindle 15 and extending up between the spindle and the cover annular portion 22 to the lower edge of the inner section of the bearing race 16. The driving collar 20 is threaded to engage threads on the lower portion of the spindle 15 and has holes 24 extending into the collar to aid in tightening the collar on the spindle. The center disk head 21 is also threaded to engage the threads on the spindle 15. The top surface of the collar 20 is provided with two ridges 25 that are concentric to each other and concentric to the spindle 15, with these ridges engaging corresponding grooves 26 and the lower surface of the gear case cover 18.

In order to properly position the bearing race 16 and bearings 17 and to prevent fine particles of metal and dust from entering the bearings, a metal washer 27 is provided extending between the lower portion of the bushing 19 and the upper portion of the annular section 23 of the driving collar 20. This metal washer has a countersunk portion 28 on its top surface that is of smaller diameter than the washer so as to provide an upwardly extending shoulder 29 on the outer edge of the washer in contact with the outer portion of the bearing race 16. This cut-out portion aids in circulation of the lubricating oil around the bearings.

Adjacent the bottom surface of the metal washer 27 there is provided a washer 30 of compressible material, such as felt. This felt washer lies between the metal washer 27 and the annular portion 22 of the cover 18 and extends from the lower edge of the bushing 19 to the annular section 23 of the driving collar 20. The felt washer forms a tight seal and prevents the escape of lubricating oil from the bearings, and also prevents dust and the like from contacting the bearings.

Having described my invention as related to the embodiment set out in the accompanying drawings, it is my intention that the invention be not limited by any of the details of description unless otherwise specified, but rather be construed broadly within its spirit and scope as set out in the accompanying claims.

I claim:

1. In a grinding machine or the like comprising a spindle upon which a grinder is to be mounted, a bearing race and bearings around the spindle, a cover surrounding said bearing race including a lower annular portion extending inwardly toward the spindle, a bushing between the cover and the bearing race, and a driving collar surrounding the outer end of the spindle and adjacent the annular portion of said cover and including an annular portion extending up between the spindle and the annular portion of the cover to the lower end of the bearing race, positioning and sealing means including an annular metal washer in contact with the lower end of said bearing race, and between the bushing and said annular portion of the driving collar, and an annular sealing washer of compressible material between said metal washer and the annular portion of said cover with the sealing washer extending from the lower end of the bushing to the annular portion of the driving collar and forming a tight seal with said annular portion.

2. The positioning and sealing means of claim 1 wherein the metal washer is provided with a cut-out portion on its top surface below the bearings and the inner section of the bearing race.

3. The positioning and sealing means of claim 1 wherein the sealing washer comprises a felt body.

4. The positioning and sealing means of claim 1 wherein the metal washer is provided with a cut-out portion on its top surface below the bearings and the inner section of the bearing race, and the sealing washer comprises a felt body.

5. In a grinding machine or the like comprising a spindle upon which a grinder is to be mounted, a bearing race and bearings around the spindle, a cover surrounding said bearing race including a lower annular portion extending inwardly toward the spindle, and a driving collar surrounding the outer end of the spindle and adjacent the annular portion of said cover and including an annular portion extending up between the spindle and the annular portion of the cover to the lower end of the bearing race, positioning and sealing means including an annular metal washer in contact with the lower end of said bearing race and between the cover and said annular portion of the driving collar, and an annular sealing washer of compressible material between said metal washer and the annular portion of the cover with the sealing washer forming a tight seal with said annular portion.

6. In a grinding machine or the like comprising a spindle upon which a grinder is to be mounted, a bearing race and bearings around the spindle, a cover surrounding said bearing race including a lower annular portion extending inwardly toward the spindle, and a driving collar surrounding the outer end of the spindle and adjacent the annular portion of said cover, positioning and sealing means including an annular metal washer in contact with the lower end of said bearing race, an annular sealing washer of compressible material between said metal washer and the annular portion of said cover and forming a tight seal between said cover and said spindle, and an annular ridge on the upper surface of the grinding collar concentric to the spindle and adapted to be received in a corresponding groove in the annular portion of the cover.

RAYMOND S. DEWEY.

REFERENCES CITED

The following references are of record in the file of this patent:

UNITED STATES PATENTS

| Number | Name | Date |
| --- | --- | --- |
| Re. 20,747 | Simpson | May 31, 1938 |
| 1,455,213 | Larsson | May 15, 1923 |
| 1,584,340 | White | May 11, 1926 |
| 1,675,624 | Taylor | July 3, 1928 |
| 1,803,062 | Hohnhorst et al. | Apr. 28, 1931 |